(12) United States Patent
Ruggiero

(10) Patent No.: US 11,309,642 B2
(45) Date of Patent: Apr. 19, 2022

(54) INSULATION PIERCING TAP CONNECTOR

(71) Applicant: Hubbell Incorporated, Shelton, CT (US)

(72) Inventor: Glen Harrison Ruggiero, Manchester, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/347,912

(22) PCT Filed: Nov. 8, 2017

(86) PCT No.: PCT/US2017/060488
§ 371 (c)(1),
(2) Date: May 7, 2019

(87) PCT Pub. No.: WO2018/089392
PCT Pub. Date: May 17, 2018

(65) Prior Publication Data
US 2019/0260142 A1 Aug. 22, 2019

Related U.S. Application Data

(60) Provisional application No. 62/419,333, filed on Nov. 8, 2016.

(51) Int. Cl.
*H01R 4/2408* (2018.01)
*H01R 11/07* (2006.01)
*H02G 1/14* (2006.01)

(52) U.S. Cl.
CPC .......... *H01R 4/2408* (2013.01); *H01R 11/07* (2013.01); *H02G 1/14* (2013.01)

(58) Field of Classification Search
CPC ......... H01R 4/2408; H01R 11/07; H02G 1/14
USPC .................. 439/425, 409–412, 417, 418
See application file for complete search history.

(56) References Cited

U.S. PATENT DOCUMENTS

| 2,597,037 A | 5/1952 | Runde | |
|---|---|---|---|
| 2,953,771 A * | 9/1960 | Kussy | H01R 4/363 439/791 |
| 3,410,950 A * | 11/1968 | Freudenberg | H01R 4/206 174/84 C |

(Continued)

FOREIGN PATENT DOCUMENTS

WO 2014152949 9/2014

OTHER PUBLICATIONS

International Search Report and Written Opinion in the PCT/US2017/060488 dated Jan. 19, 2018.

*Primary Examiner* — Travis S Chambers
(74) *Attorney, Agent, or Firm* — Wissing Miller LLP

(57) ABSTRACT

A tap connector that includes a tap body and an insulation piercing assembly or module is provided. The insulation piercing assembly is secured to the tap body and movable relative to the tap body. The insulation piercing assembly includes a conductive body, at least two sets of electrically conductive insulation piercing teeth secured to the conductive body and a non-conductive cap or coating covering the teeth. When the teeth pierce the non-conductive caps or coating exposing the teeth, the teeth can pierce insulation surrounding the main and tap conductors creating an electrically conductive path between the main conductor and the tap conductor.

18 Claims, 15 Drawing Sheets

(56) References Cited

U.S. PATENT DOCUMENTS

| | | | | |
|---|---|---|---|---|
| 3,549,786 | A | * | 12/1970 | Kuo ............... H01R 4/2495 174/84 C |
| 3,688,247 | A | * | 8/1972 | Prodel ............ H01R 4/2483 439/416 |
| 3,710,303 | A | | 1/1973 | Gallager, Jr. |
| 3,848,956 | A | * | 11/1974 | Kraft ............. H01R 4/2408 439/411 |
| 4,050,761 | A | | 9/1977 | De France |
| 4,080,034 | A | * | 3/1978 | Werner ........... H01R 4/2408 439/413 |
| 4,293,176 | A | | 10/1981 | Lindlof |
| 6,099,344 | A | | 8/2000 | Chadbourne |
| 6,120,334 | A | * | 9/2000 | Timsit ............ H01R 4/5083 439/783 |
| 7,090,544 | B2 | * | 8/2006 | Campbell ......... H01R 4/2408 439/411 |
| 9,287,673 | B2 | * | 3/2016 | Galla ............. H01R 9/031 |
| 9,548,557 | B2 | * | 1/2017 | Liu ............... H01R 43/005 |
| 9,577,351 | B2 | | 2/2017 | Martin |
| 2013/0130538 | A1 | * | 5/2013 | La Salvia ........ H01R 25/14 439/391 |
| 2019/0148844 | A1 | * | 5/2019 | Kruzel ........... H01R 43/01 439/391 |

* cited by examiner

INSULATION PIERCING TAP CONNECTOR

CROSS-REFERENCE TO RELATED APPLICATIONS

This application is a 371 of PCT/US2017/060488 filed on Nov. 8, 2017, published on May 17, 2018 under publication number WO 2018/089392 A1, which claims priority benefits from U.S. Provisional Application No. 62/419,333 filed Nov. 8, 2016 the entire contents of both are incorporated herein in their entirety by reference.

BACKGROUND

Field

The present disclosure relates generally to tap connectors for utility cabling and more particularly to tap connectors for clamping and electrically connecting tap conductors to main conductors.

Description of the Related Art

Aerial high tension electrical power conductors are typically strung from utility pole to utility pole, or from a utility pole to a building. The electrical power conductors between utility poles are often referred to as main span conductors. With aerial electrical power conductors, when power is to be supplied to an auxiliary source or transferred around a utility pole with dead-ends on each side of the pole, connections with the power conductors are typically made in close proximity to the utility pole or building. Examples of auxiliary sources include transformers, switches, cutouts, arresters, etc. Tap conductors are used to supply power from the main span conductors to the auxiliary source, and jumper connections are used to transfer power around a pole with dead-ends on each side. In either case, a tap clamp is used to clamp the tap conductors or jumpers to the main span conductor. However, conventional tap clamps mechanically clamp the tap conductors or jumpers to the main span conductor, but electrical connections are made separately from the tap clamp. Accordingly, a tap connector capable of clamping a tap conductor to a main span conductor and electrically connecting the tap conductor to the main span conductor is needed.

SUMMARY

The present disclosure provides embodiments of tap conductors used to connect a tap conductor to a main conductor. In an exemplary embodiment, the tap connector includes a tap body, a keeper, a stem and an insulation piercing assembly. The tap body includes a first side wall, a second side wall, a base at one end of the tap body between the first and second side walls and a cap at another end of the tap body between the first and second side walls. The keeper is positioned between the first and second side walls and is movable toward and away from the cap relative to the tap body. The keeper has a tap conductor groove that faces the cap to support a tap conductor. The keeper also includes a coupling member used to couple the keeper to the stem. The stem includes a stem coupling member at one end of a threaded shaft and a tool mounting member at the other end of the threaded shaft. The threaded shaft is positioned within a threaded aperture in the base wall. The stem coupling member is coupled to the keeper coupling member such that rotational movement of the stem is translated to linear movement of the keeper. The insulation piercing assembly is movably secured to the side walls of the tap body and is positioned adjacent the keeper so that movement of the keeper toward the cap can move the insulation piercing assembly toward the cap. The insulation piercing assembly is capable of piercing insulation surrounding the main conductor and the tap conductor to create an electrically conductive path between the main conductor and the tap conductor.

In an exemplary embodiment, the insulation piercing assembly includes a non-conductive body and a side wall mounting member at each end of the body for movably securing the insulation piercing assembly to the side walls. The insulation piercing assembly includes an insulation piercing member embedded in the non-conductive body. The insulation piercing member has one or more main conductor teeth extending from one end and one or more tap conductor teeth extending from another end. The one or more main conductor teeth are insulated until the one or more main conductor teeth penetrate insulation surrounding a main conductor, and the one or more tap conductor teeth are insulated until the one or more tap conductor teeth penetrate insulation surrounding a tap conductor. The insulation covering the one or more main conductor teeth may include a flexible main cap releasably secured to the body that covers the one or more main conductor teeth. The insulation covering the one or more tap conductor teeth may include a flexible tap cap releasably secured to the body that covers the one or more tap conductor teeth.

In another exemplary embodiment, the tap connector includes a tap body and an insulation piercing assembly. The tap body includes a removable cap such that the tap body and removable cap are capable of securing a main conductor and a tap conductor to the tap connector. The insulation piercing assembly is positioned between the tap body and the removable cap and is movable at least relative to the tap body. In an exemplary embodiment, the insulation piercing assembly includes a non-conductive body and an insulation piercing member embedded in the non-conductive body. The insulation piercing member has one or more main conductor teeth extending from one end and one or more tap conductor teeth extending from another end. The one or more main conductor teeth are insulated until the one or more main conductor teeth penetrate insulation surrounding the main conductor, and the one or more tap conductor teeth are insulated until the one or more tap conductor teeth penetrate insulation surrounding the tap conductor. As an example, the main conductor teeth can be insulated by a non-conductive coating applied to the teeth such that when the main conductor teeth pierce the insulation surrounding the main conductor the non-conductive coating is removed so as to electrically connect the main conductor teeth to the main conductor. Similarly, the tap conductor teeth can be insulated by a non-conductive coating applied to the teeth such that when the tap conductor teeth pierce the insulation surrounding the tap conductor the non-conductive coating is removed so as to electrically connect the tap conductor teeth to the tap conductor. As another example, the main conductor teeth can be insulated by positioning a non-conductive cap over the main conductor teeth, and the tap conductor teeth can be insulated by positioning a non-conductive cap over the tap conductor teeth. The non-conductive cap over the main conductor teeth can be secured to the non-conductive body, and the non-conductive cap over the tap conductor teeth can be secured to the non-conductive body. The insulation piercing assembly can be movable at least relative to the tap body by sliding the insulation piercing assembly along the tap body, or the insulation piercing assembly can be movable at least relative to the tap body by pivoting the insulation piercing assembly relative to the tap body.

In another exemplary embodiment, the tap connector includes a tap body, a cap and an insulation piercing assembly. The tap body has a main conductor receiving portion. The cap is removably secured to the tap body and includes a tap conductor receiving portion. The insulation piercing assembly is pivotally secured to the tap body such that the insulation piercing assembly can be positioned between the tap body and the cap. In an exemplary embodiment, the insulation piercing assembly includes a non-conductive body and an insulation piercing member embedded in the non-conductive body. The insulation piercing member includes one or more main conductor teeth aligned with the main conductor receiving portion of the tap body, and one or more tap conductor teeth aligned with the tap conductor receiving portion of the cap. The one or more main conductor teeth are insulated until the one or more main conductor teeth penetrate insulation surrounding a main conductor, and the one or more tap conductor teeth are insulated until the one or more tap conductor teeth penetrate insulation surrounding a tap conductor as described above.

In another exemplary embodiment, the tap connector includes a tap body, a cap and an insulation piercing assembly. The tap body includes a main conductor receiving portion. The cap is removably secured to the tap body and includes a tap conductor receiving portion. The insulation piercing assembly is removably secured to the tap body such that the insulation piercing assembly can be positioned between the tap body and the cap. The insulation piercing assembly includes an electrically conductive body and a non-conductive coating surrounding the body to electrically insulate exterior surfaces of the body. The electrically conductive body includes one or more tap conductor teeth aligned with the tap conductor receiving portion of the cap, and one or more main conductor teeth aligned with the main conductor receiving portion of the tap body.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
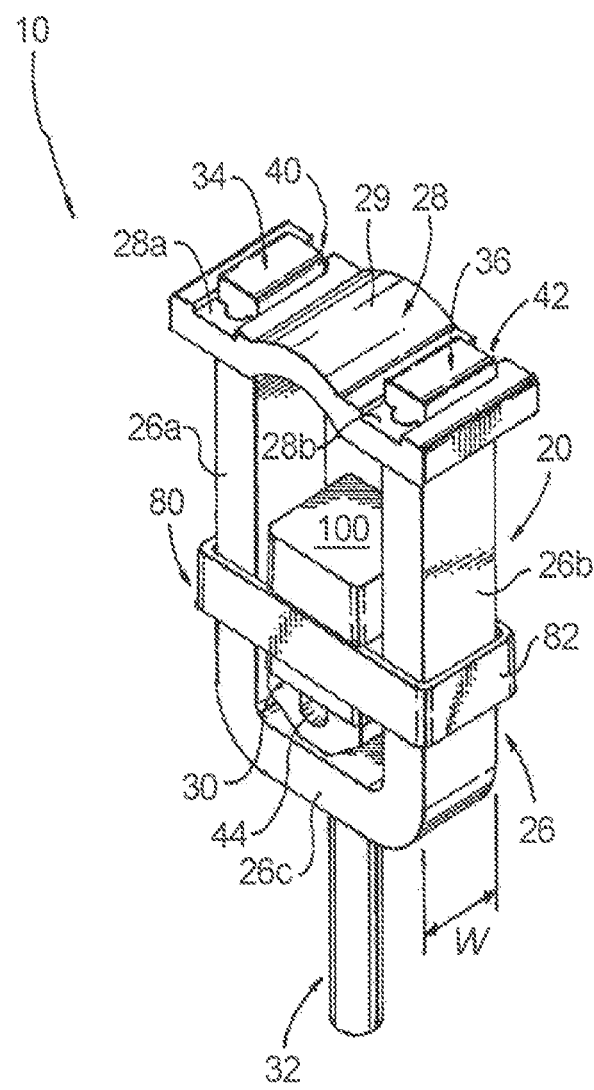
FIG. 1 is a perspective view of an exemplary embodiment of a tap connector according to the present disclosure, illustrating a tap body and an insulation piercing assembly movably attached to the tap body.

Exemplary embodiments of the tap connector of the present disclosure are shown and described. The tap connector according to the present disclosure can be installed in close proximity to the main conductors or from the ground with an extendable reach tool. In one exemplary embodiment, the tap connector includes a tap body and an insulation piercing assembly or module that is secured to the tap body and movable relative to the tap body. In one exemplary embodiment, the insulation piercing assembly includes a conductive body, at least two sets of electrically conductive insulation piercing teeth secured to the conductive body and a non-conductive cap covering each set of teeth. When the teeth pierce the non-conductive caps exposing the teeth, the teeth can pierce insulation surrounding the main and tap conductors creating an electrically conductive path between the main conductor and the tap conductor.

In another exemplary embodiment, the insulation piercing assembly includes a conductive body and at least two sets of electrically conductive insulation piercing teeth integrally formed into or secured to the conductive body. The sets of electrically conductive teeth are electrically connected to each other to form an electrically conductive path between the sets of electrically conductive teeth. The conductive body and/or electrically conductive teeth are preferably coated with a non-conductive coating. When the electrically conductive teeth pierce the insulation surrounding the main or tap conductors the non-conductive coating on the teeth is removed exposing the teeth so that the teeth can contact the conductor within the surrounding insulation and form an electrically conductive path between the main conductor and the tap conductor.

For the purposes of the present disclosure, a main conductor can be any conductor used to conduct electricity, such as a main span conductor. For the purposes of the present disclosure, the tap conductor can be any electrical conductor used to conduct electricity from a main conductor to an auxiliary source.

Referring now to FIGS. 1-8, an exemplary embodiment of the tap connector according to the present disclosure is shown. The tap connector 10 includes a frame 20 and an insulation piercing assembly or module 80. In this exemplary embodiment, the frame 20 comprises a tap body 26, a cap 28, keeper 30 and a stem 32. The tap body 26 in this exemplary embodiment has a pair of side walls 26a and 26b and a base wall 26c between the side walls 26a and 26b forming a U-shaped member. The side walls 26a and 26b and the base wall 26c are rectangular in shape with a width "W" that is sufficient to support the insulation piercing assembly 80. The side walls 26a and 26b and base wall 26c may be integrally formed or they may be secured together using for example welds or fasteners. At a distal end of side wall 26a is a cap receiving member 34, and at a distal end of side wall 26b is a cap receiving member 36. The cap receiving members in this embodiment are T-shaped members having a vertical rail 34a, 36a and a cross rail 34b, 36b. The base wall 26c has a threaded aperture 38.

The cap 28 is connected between the side walls 26a and 26b of the tap body 26 and is configured to be releasably secured to the tap body 26. In the example shown, the cap 28 includes slots 40 and 42 at each end of the cap as shown. Slot 40 is configured to receive the cap receiving member 34, and slot 42 is configured to receive the cap receiving member 36. An upper surface of the cap 28 associated with the slot 40 includes a recess 28a configured to receive the cross-rail 34b of the cap receiving member 34. An upper surface of the cap 28 associated with the slot 42 includes a recess 28b configured to receive the cross-rail 36b of the cap receiving member 36. The recesses 28a and 28b permit the cross-rails 34b and 36b to slide onto the tap body 26 and to lock the cap 28 onto the tap body 26 when the tap connector 10 is in use. The cap 28 also include a conductor receiving portion 29. The conductor receiving portion 29 comprises, for example, a groove that is shaped to receive, support and align a conductor, such as main conductor 510 described above, relative to the insulation piercing assembly 80. In the embodiment shown, the conductor receiving portion 29 groove is generally arcuate to receive a circular or round conductor. However, the groove may have other shapes sufficient to receive, support and align an electrical conductor relative to the insulation piercing assembly 80.

The keeper 30 is preferably a solid member configured to fit between the side walls 26a and 26b of the tap body 26. The keeper 30 has a top portion with a tap conductor groove 44 that faces the cap 28. The keeper 30 is movable between the side walls 26a and 26b. The keeper 30 has a bottom portion 46 with a coupling member 48, seen in FIG. 4, used to couple the keeper 30 to the stem 32. In the configuration shown, the coupling member 48 is a channel.

Figure 2:
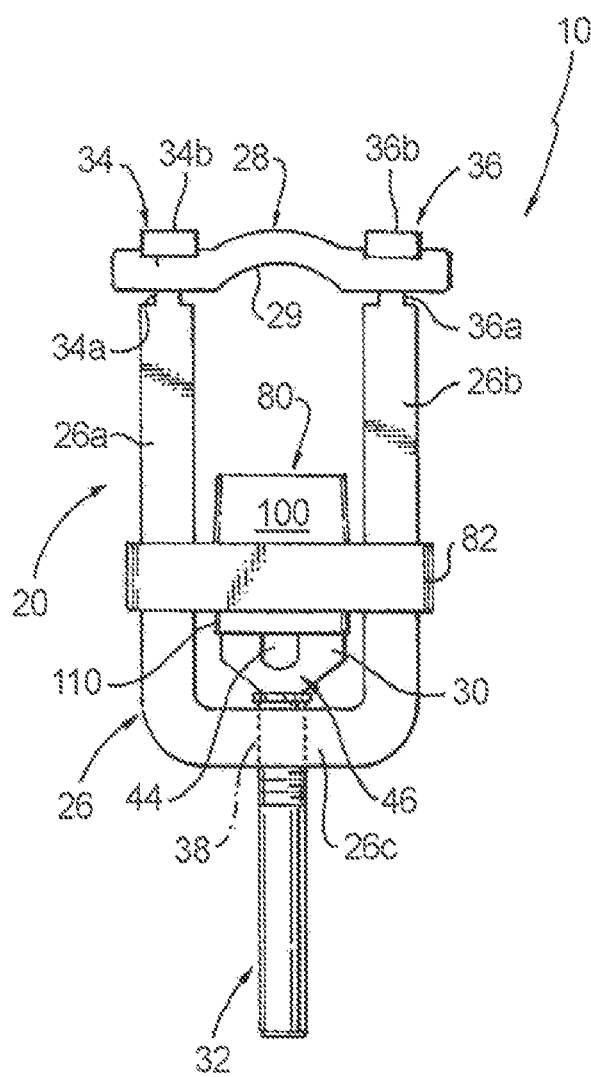
FIG. 2 is a front elevation view of the tap connector of FIG. 1.
Figure 3:
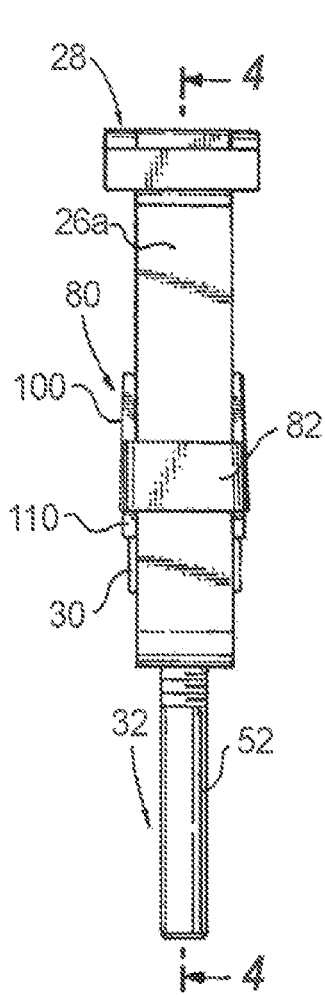
FIG. 3 is a side elevation view of the tap connector of FIG. 1.
Figure 4:
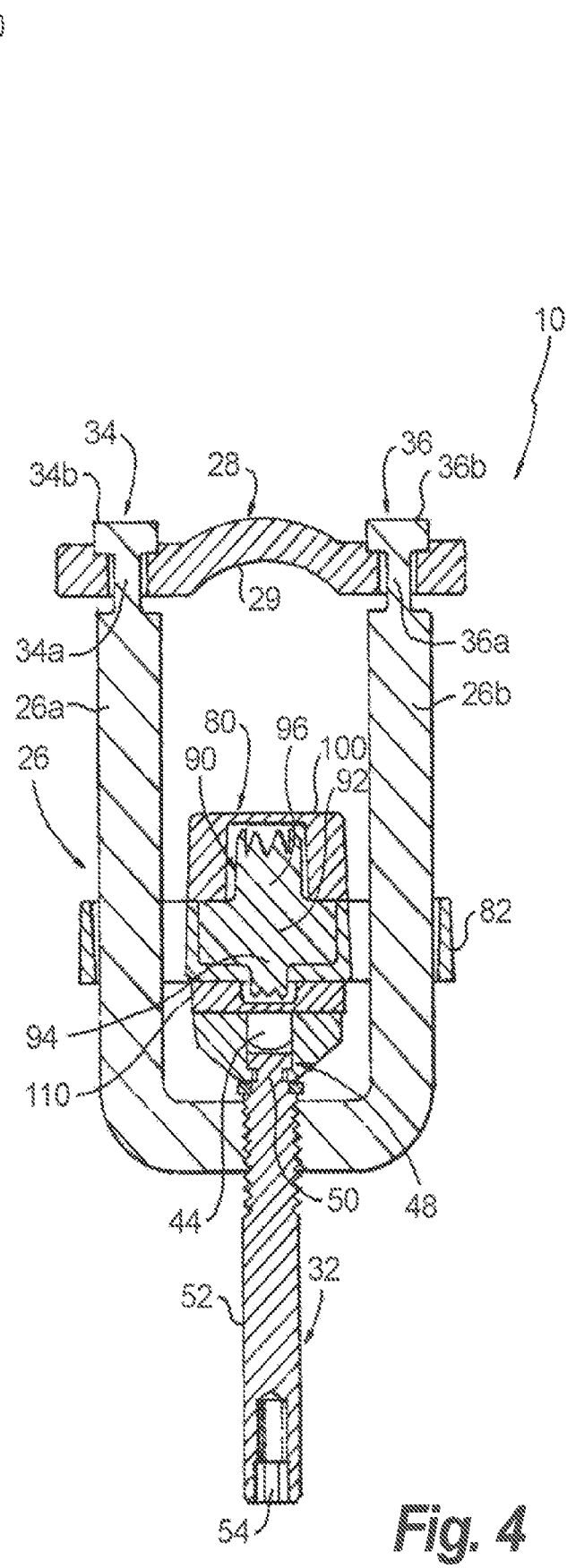
FIG. 4 is a cross sectional view of the tap connector of FIG. 3 taken along line 4-4.
Figure 5:
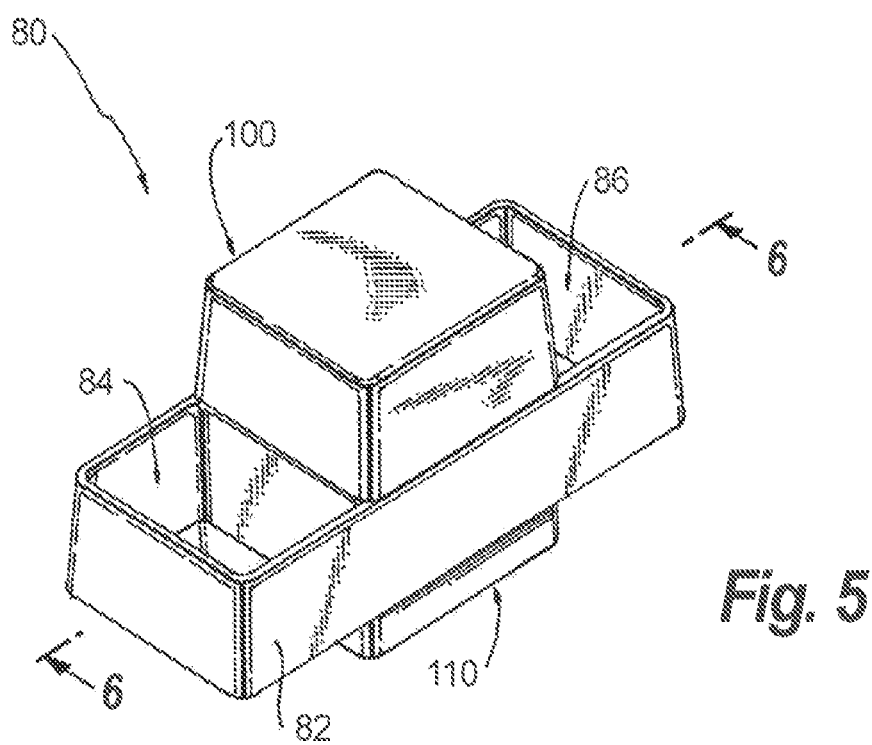
FIG. 5 is top perspective view of an exemplary embodiment of the insulation piercing assembly of FIG. 1.
Figure 6:
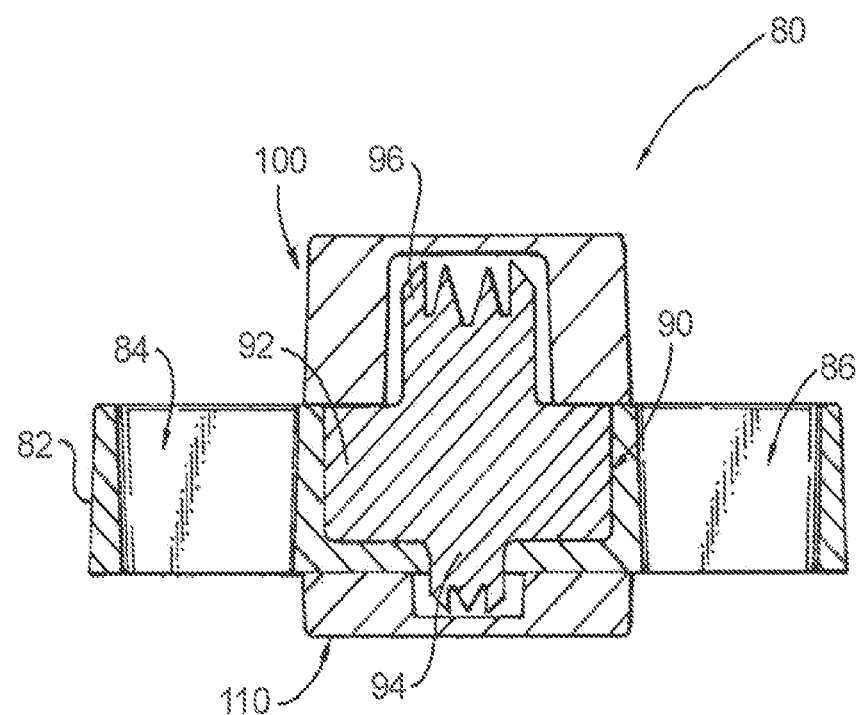
FIG. 6 is a cross-sectional view of the insulation piercing assembly of FIG. 5 taken along line 6-6.
Figure 7:
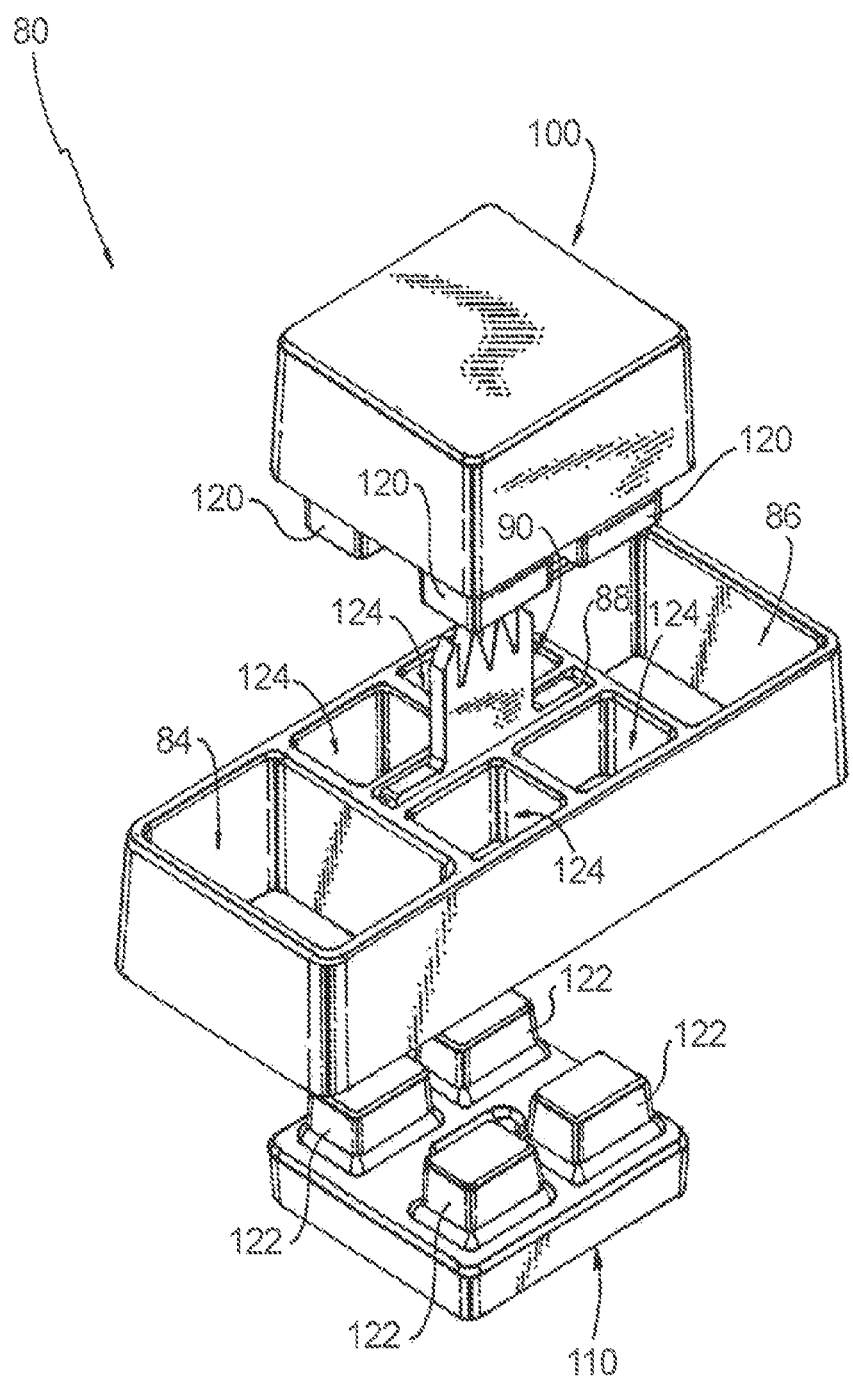
FIG. 7 is a top perspective view with parts separated of the insulation piercing assembly of FIG. 5.
Figure 8:
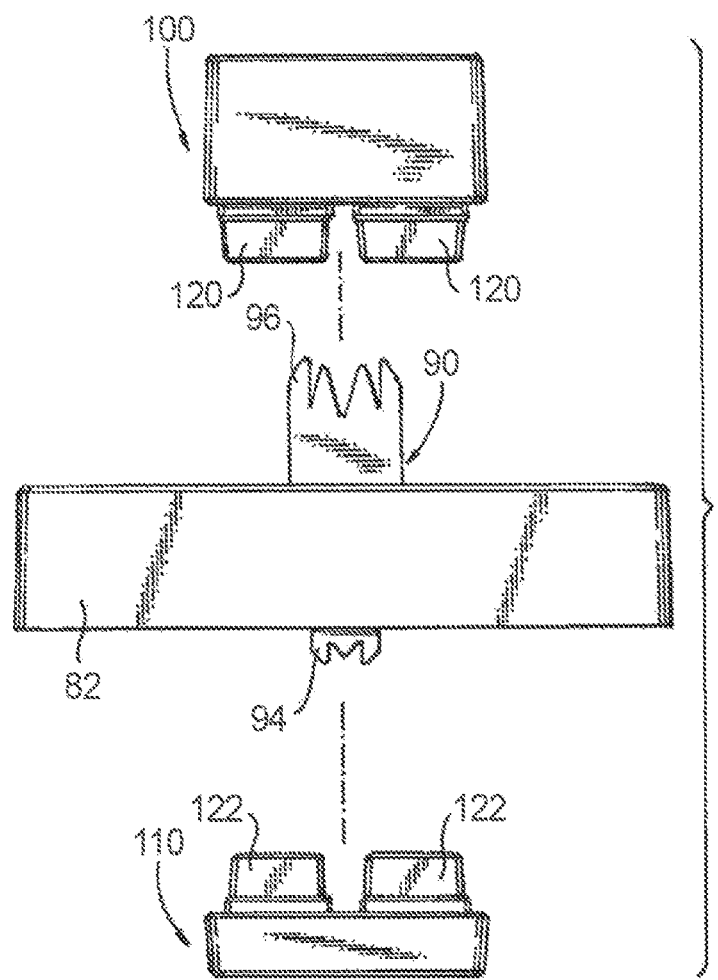
FIG. 8 is a front elevation view of the insulation piercing assembly of FIG. 7.
Figure 9:
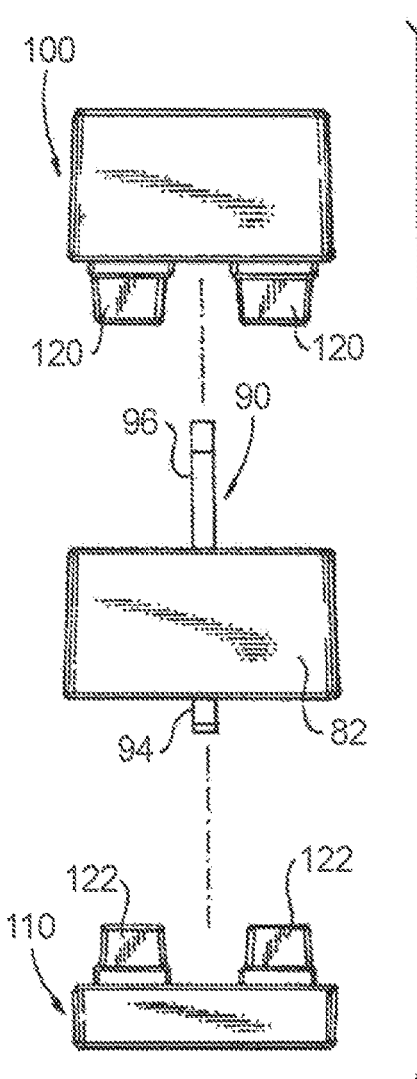
FIG. 9 is a side elevation view of the insulation piercing assembly of FIG. 7.

Referring to FIGS. 1, 2 and 4, the stem 32 includes a stem coupling member 50 and a threaded shaft 52. The stem 32 may also include a tool mounting member 54 at an end of the shaft 52. The stem coupling member 50 is configured to couple with the keeper coupling member 48 so that the stem 32 can be coupled to the keeper 30. The stem coupling member 50 in the configuration shown is a T-shaped member configured to fit within the keeper coupling channel 48 in the keeper 30. The threaded shaft 52 is threaded into a threaded aperture 38, seen in FIG. 2, in the base wall 26c of the tap body 26. The tool mounting member 54 of the stem 32 is used to releasably couple the stem 32 to a tool, such as a torque wrench. In another embodiment, the tool mounting member 54 can be an eye, looped or hooked member so that the stem 32 can be releasably coupled to an extendable reach tool, such as for example, a hot stick. Threading the shaft 52 into the aperture 38 of the base wall 26c and coupling the stem 32 to the keeper 30 using the stem coupling member 50 facilitates the translation of rotational movement of the stem 32 to linear movement of the keeper 30 between the side walls of the tap body 26.

In the configuration of FIGS. 1-4, the tap body 26, cap 28, keeper 30 and stem 32 cant made of a rigid material that may be electrically conductive or a rigid material that may be non-conductive material (i.e., an electrical insulating material) or a combination thereof. Examples of suitable rigid materials that are electrically conductive include, aluminum, cast aluminum, galvanized steel, and stainless steel. Examples of rigid materials that are non-conductive materials include rigid plastic materials and composite materials, e.g., carbon fiber.

Referring to FIGS. 5-9, an exemplary embodiment of the insulation piercing assembly or module 80 is shown. For ease of description, the insulation piercing assembly 80 may also be referred to the "assembly." The assembly 80 includes a tooth support body 82, a main side cap 100 and a tap side cap 110. The tooth support body 82 may be referred to as the "body" and is preferably made of a rigid material that is non-conductive material (i.e., an electrical insulating material), such as a rigid plastic material, a rigid rubber material or a composite material, and includes openings 84 and 86 at each end that are configured to receive a side wall of the tap body 26. The openings 84 and 86 permit the assembly 80 to be positioned between the side walls 26a and 26b of the tap body 26, as seen FIG. 2, and to move the assembly 80 relative to the side walls 26a and 26b. To illustrate, opening 84 can receive side wall 26a of the tap body 26 and opening 86 can receive side wall 26b of the tap body 26. The openings 84 and 86 are preferably configured to permit the assembly 80 to move relative to the side walls 26a and 26b. The body 82 also includes a center pocket 88 between the openings 84 and 86 that is used to support an insulation piercing member 90. In the embodiment shown, the insulation piercing member 90 includes a conductive body 92 having one or more tap conductor teeth 94 extending from one end of the conductive body 92, and one or more main conductor teeth 96 extending from another end of the conductive body 92. The conductive body 92, one or more tap conductor teeth 94 and the one or more main conductor teeth 96 are made of an electrically conductive material, such as copper or aluminum, to create an electrically conductive path between the one or more tap conductor teeth 94 and the one or more main conductor teeth 96. Preferably, the conductive body 92 is sufficiently snug within the center pocket 88 to limit the movement of the insulation piercing member 90 within the pocket 88 while allowing replacement of the insulation piercing member 90 so that the tap connector 10 can be reused in the event one or more teeth are damaged.

The main side cap 100 is made of a flexible non-conductive material, such as rubber or flexible plastic, and is configured to cover the one or more main conductor teeth 96 and to permit the one or more main conductor teeth 96 to penetrate the main cap 100 when the tap connector 10 is installed, as will be described below. The main cap 100 also acts as a gasket to provide a watertight seal around the one or more main conductor teeth 96. The main cap 100 can be releasably secured to the body 82 so that the main cap 100 can be removed to permit replacement of the insulation piercing member 90, or the main cap can be permanently secured to the body 82 with for example adhesives. In the embodiment shown, main cap 100 includes one or more mounting projections 120, seen in FIGS. 7-9, and the body 82 includes a corresponding one or more mounting openings 124 around the insulation piercing member 90. The mounting projections 120 slide within the mounting openings 124 to releasably secure the main cap to the body 82. Similarly, the tap side cap 110 is made of a flexible non-conductive material, such as rubber or flexible plastic, and is configured to cover the one or more tap conductor teeth 94 and to permit the one or more tap conductor teeth 94 to penetrate the tap side cap 110 when the tap connector 10 is installed, as will be described below. The tap side cap 110 also acts as a gasket to provide a watertight seal around the one or more tap conductor teeth 94. The tap cap 110 can be releasably secured to the body 82 so that the tap side cap 110 can be removed to permit replacement of the insulation piercing member 90, or the tap side cap 110 can be permanently secured to the body 82 with for example adhesives. In the embodiment shown, the tap side cap 110 includes one or more mounting projections 122, seen in FIGS. 7-9, that slide within the corresponding one or more mounting openings 124 to releasably secure the tap side cap 110 to the body 82.

Figure 10:
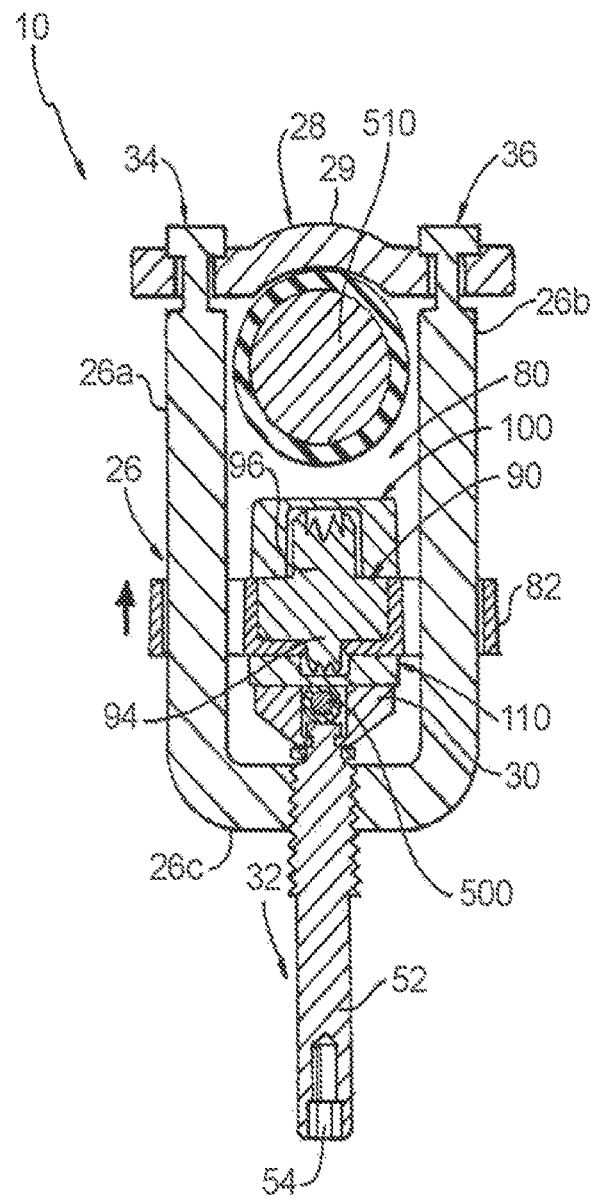
FIG. 10 is a cross sectional view of the tap connector of FIG. 3 similar to FIG. 4 and illustrating a main conductor in a main conductor receiving portion of the tap connector, and a tap conductor in a tap conductor receiving portion of the tap connector.
Figure 11:
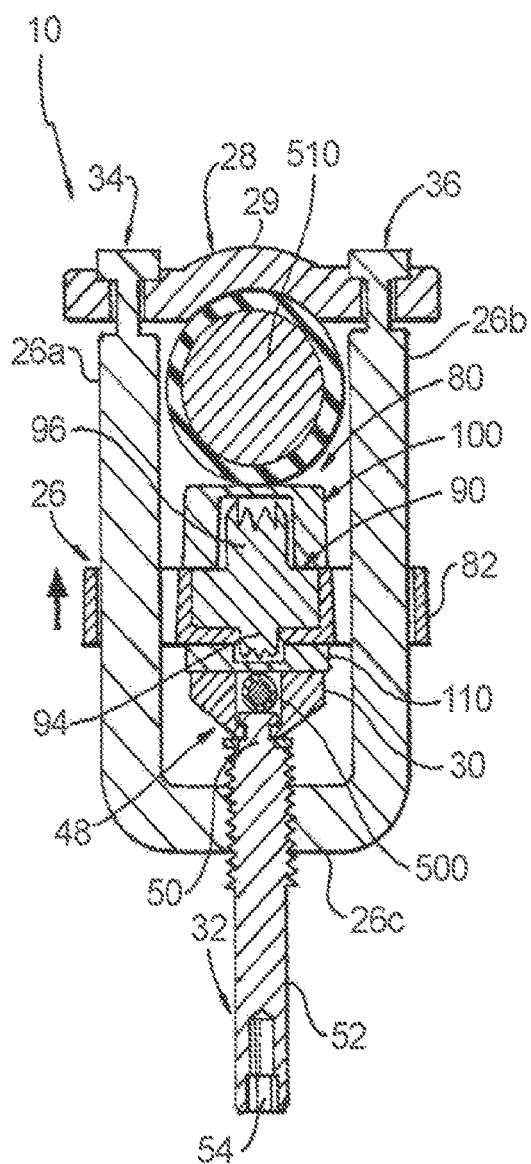
FIG. 11 is a cross sectional view of the tap connector of FIG. 3 similar to FIG. 10, illustrating the insulation piercing assembly moving toward the main conductor.

Referring now to FIGS. 10 and 11, to install the tap connector 10 of the present disclosure a technician, using for example a torque wrench, turns the stem 32 counter-clockwise to move the keeper 30 toward the base wall 26c of the tap body 26, as seen in FIG. 10. By moving the keeper 30 toward the base wall 26c sufficient space is created to permit a main conductor 510 to be positioned within the tap body 26 and a tap conductor 500 to be positioned within the tap conductor groove 44 in keeper 30, as shown. With a tap conductor 500 and the main conductor 510 positioned in the tap connector 10, the technician advances the stem 32, e.g., turns the stem clockwise, causing the keeper 30 and the assembly 80 to move linearly between the side walls 26a and 26b toward the cap 28. As the stem 32 is further advanced (e.g., rotated), the main side cap 100 of the assembly 80 engages the main conductor 510. Further advancement of the stem 32 causes the keeper 30 to compresses the tap side cap 110 so that the tap conductor teeth 94 penetrate through the tap side cap 110 into the insulation surrounding the tap conductor 500. At the same time, the main side cap 100 compresses so that the main conductor teeth 96 penetrate through the main side cap 100 into the insulation surrounding the main conductor 510. Further advancement of the stem 32 causes the keeper 30 to further compress the tap side cap 110 so that the tap conductor teeth 94 pierce through the insulation surrounding the tap conductor 500 to contact the tap conductor. At the same time, the main side cap 100 further compresses so that the main conductor teeth 96 pierce through the insulation surrounding the main conductor 510 to contact the main conductor 510. If a torque wrench is used to rotate the stem 32 to compress the main conductor teeth 96 and the tap conductor teeth 94 to pierce through their respective conductor insulation, a desired minimum torque of about 75 inch/lbs. is used to ensure that the teeth penetrate the conductor insulation and contact the conductors 500 and 510. At this point, the tap conductor 500 is electrically connected to the main conductor 510.

Figure 12:
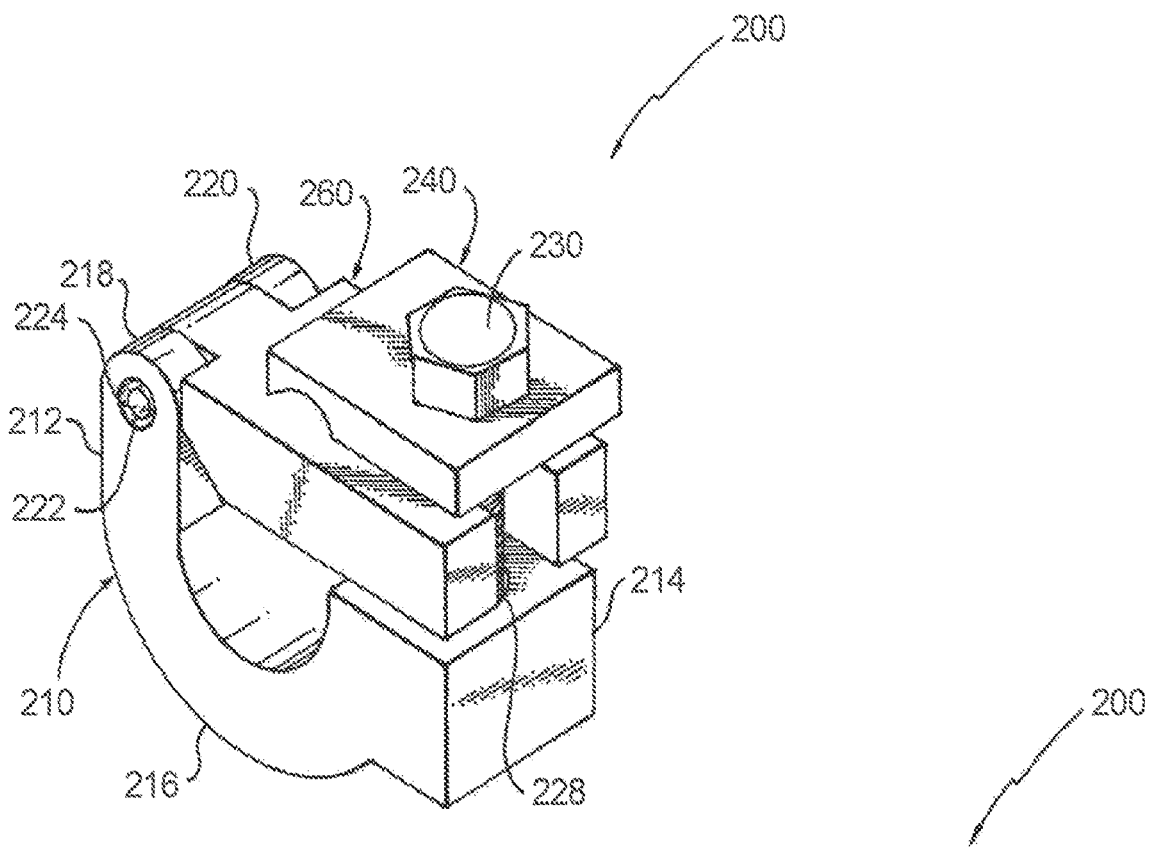
FIG. 12 is a perspective view of another exemplary embodiment of a tap connector according to the present disclosure, illustrating a tap body, an insulation piercing assembly pivotably attached to the tap body and a cap releasably secure to the tap body.
Figure 13:
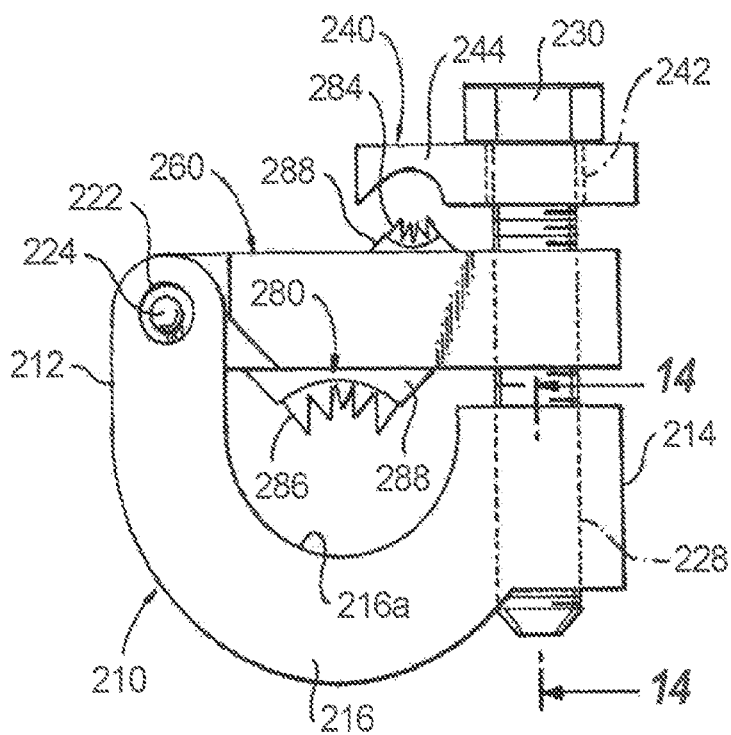
FIG. 13 is a front elevation view of the tap connector of FIG. 12.
Figure 14:
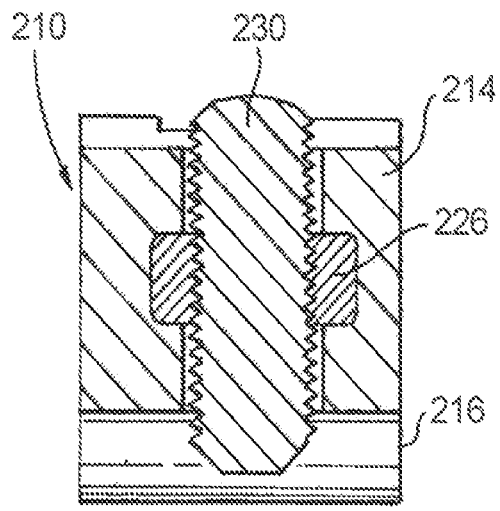
FIG. 14 is a partial cross-sectional view of the tap connector of FIG. 13 taken along line 14-14 and illustrating a fastener embedded within the tap body used to facilitate securing the insulation piercing assembly and cap to the tap body.
Figure 15:
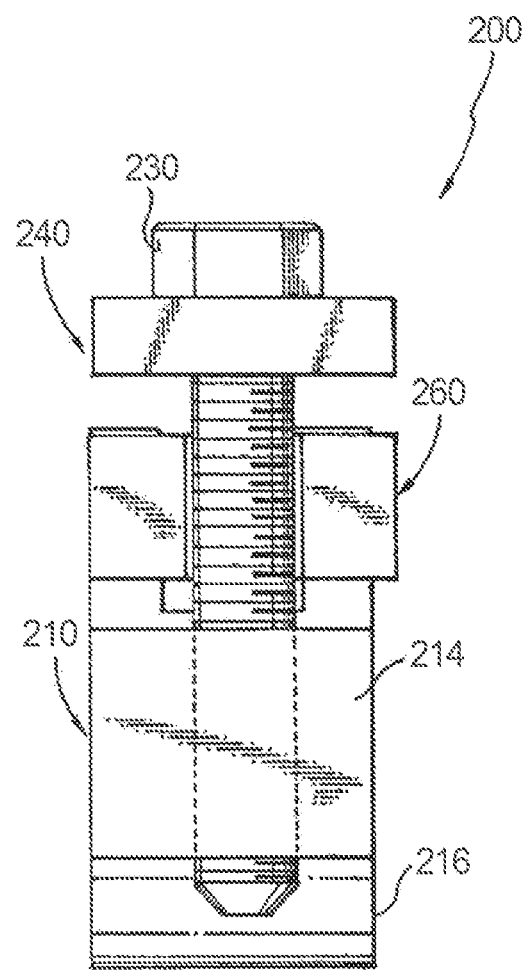
FIG. 15 is a side elevation view of the tap connector of FIG. 12.
Figure 16:
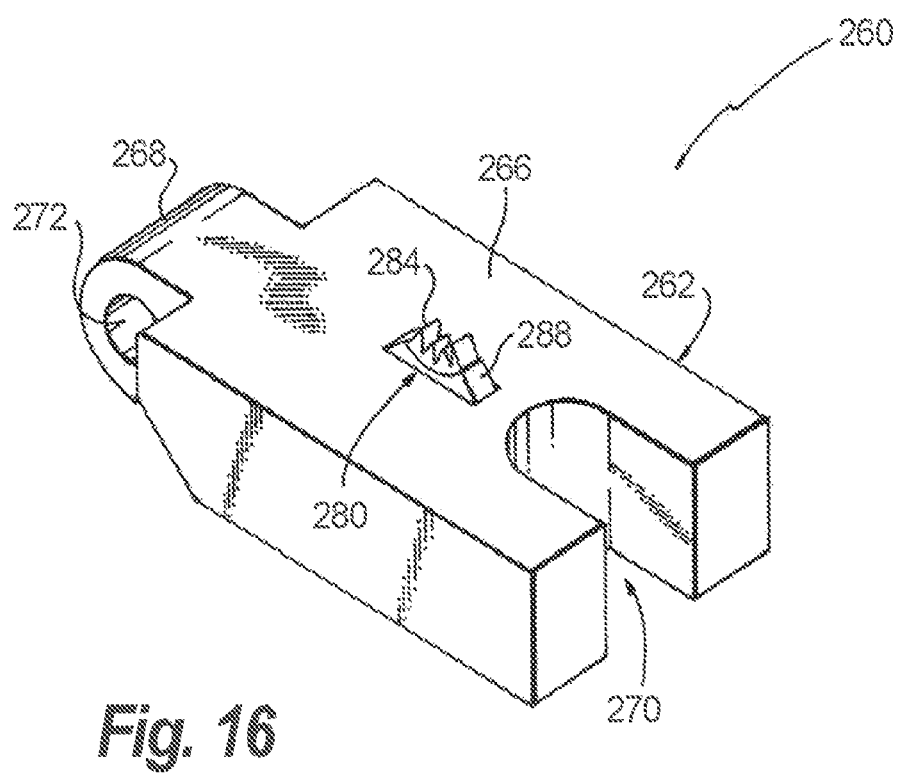
FIG. 16 is a top perspective view of the insulation piercing assembly of FIG. 12 illustrating teeth used to pierce the insulation of a tap conductor.
Figure 17:
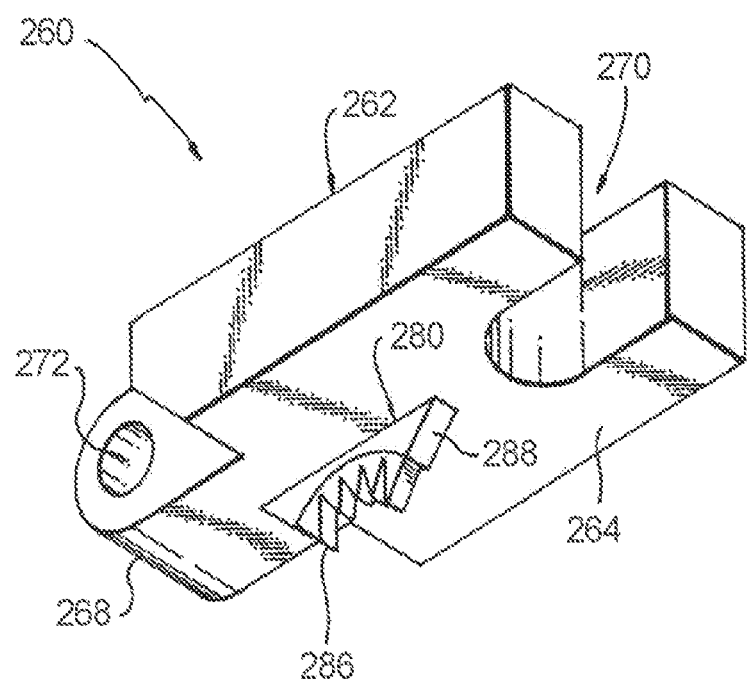
FIG. 17 is a bottom perspective view of the insulation piercing assembly of FIG. 12 illustrating teeth used to pierce the insulation of a main conductor.
Figure 18:
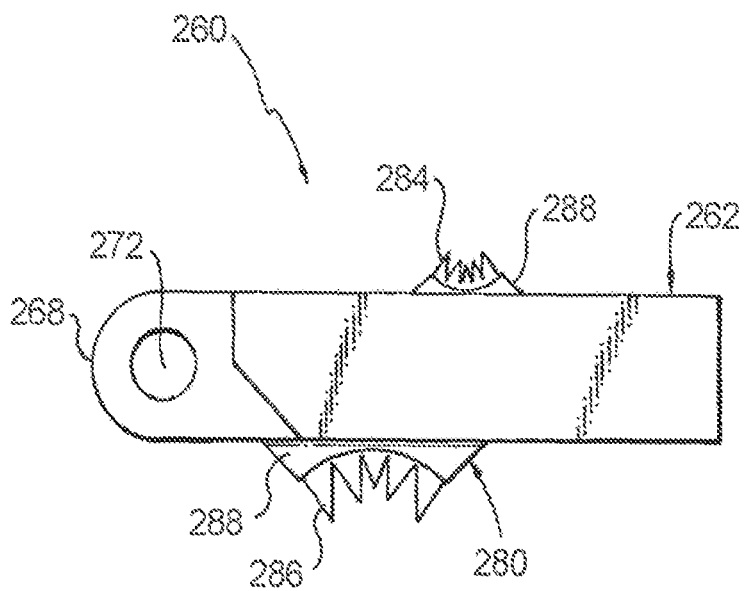
FIG. 18 is a front elevation view of the insulation piercing assembly of FIG. 12.
Figure 19:
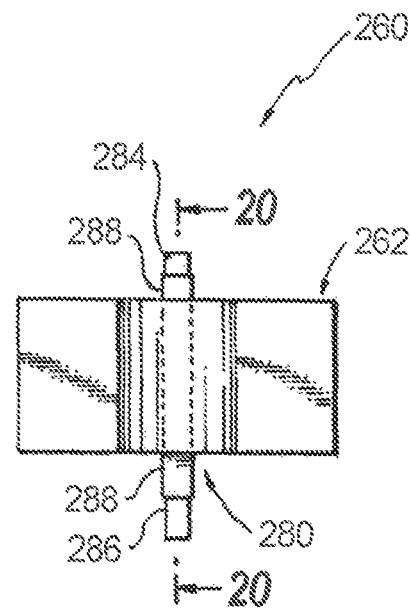
FIG. 19 is a side elevation view of the insulation piercing assembly of FIG. 12.

Turning to FIGS. 12-19, another exemplary embodiment of the tap connector according to the present disclosure is shown. In this configuration, the tap connector 200 includes a tap body 210, a cap 240 and an insulation piercing assembly 260. The tap body 210 has a first leg 212, a second leg 214 and a conductor receiving portion 216 between the first leg 212 and second leg 214, which may form a U-Shaped type member. At an end of the first leg 212 is a mounting member 218 configured to receive and pivotably support the insulation piercing assembly 260, as described in more detail below. In the exemplary embodiment shown, the mounting member 218 is in the form of a notch 220 in the end of the first leg 212 with an aperture 222 in each side wall of the notch 220 through which a pivot pin 224 can pass, as shown. The second leg 214 has an embedded fastener 226, e.g., a threaded nut seen in FIG. 14, and an aperture 228 extending at least between the embedded fastener 226 and an outer wall of the second leg 214. The nut in conjunction with bolt 230 is used to secure the tap body 210, cap 240 and the insulation piercing assembly 260 together, as will be described below. In another embodiment, the fastener 226 may be a threaded aperture through the second leg used with the bolt 230 to secure the tap body 210, cap 240 and the insulation piercing assembly 260 together. Referring to FIGS. 12 and 13, the conductor receiving portion 216 includes a groove 216a that is shaped to receive, support and align a conductor, such as main conductor 510 described above, relative to the insulation piercing assembly 260. In the embodiment shown, the conductor receiving portion groove 216a is generally arcuate to receive a circular or round conductor. However, the groove 216a may have other shapes sufficient to receive and support an electrical conductor.

Continuing to refer to FIGS. 12-15, the cap 240 has an aperture 242, shown in dotted lines in FIG. 13, through which bolt 230 can pass, and a conductor receiving portion 244 that is shaped to receive, support and align a conductor, such as tap conductor 500 described above, relative to the insulation piercing assembly 260. In the embodiment shown, the conductor receiving portion 244 is a groove that is generally arcuate in shape to receive a circular or round conductor and align the conductor with the insulation piercing assembly 260 as described below. However, the groove 244 may have other shapes sufficient to receive and support an electrical conductor.

Referring to FIGS. 16-19, an exemplary embodiment of the insulation piercing assembly or module is shown. For ease of description, the insulation piercing assembly 260 may also be referred to as the "assembly." The assembly 260 includes a tooth support body 262 having a main side 264 and a tap side 266. The tooth support body 262 may also be referred to as the "body." Extending from one side of the body 262 is a pivot pin bracket 268 and extending from an opposite end of the body is a slot 270. The body 262 may be solid or hollow, and may be made of a rigid material that may be non-conductive (i.e., an electrical insulating material), such as a rigid plastic material or a composite material. In another embodiment, the body 262 may be made of a rigid material that is electrically conductive, such as galvanized steel, stainless steel, aluminum or cast aluminum. The pivot pin bracket 268 has an aperture 272 for receiving the pivot pin 224, seen in FIGS. 12 and 13. More specifically, the body 262 is pivotably secured to the mounting member 218 of the first leg 212 by positioning the pivot pin bracket 268 in notch 220 as seen in FIG. 12 of the mounting member 218 and then passing the pivot pin 224 through the apertures 222 and aperture 272 in the pivot pin bracket 269. In this configuration, the assembly 260 can pivot between an open position, seen in FIG. 21 and a closed position, seen in FIGS. 22 and 23. The slot 270 in the body 262 permits the bolt 230 to pass through the assembly 260. However, one skilled in the art would readily appreciate that an aperture could be substituted for the slot 270.

Figure 20:
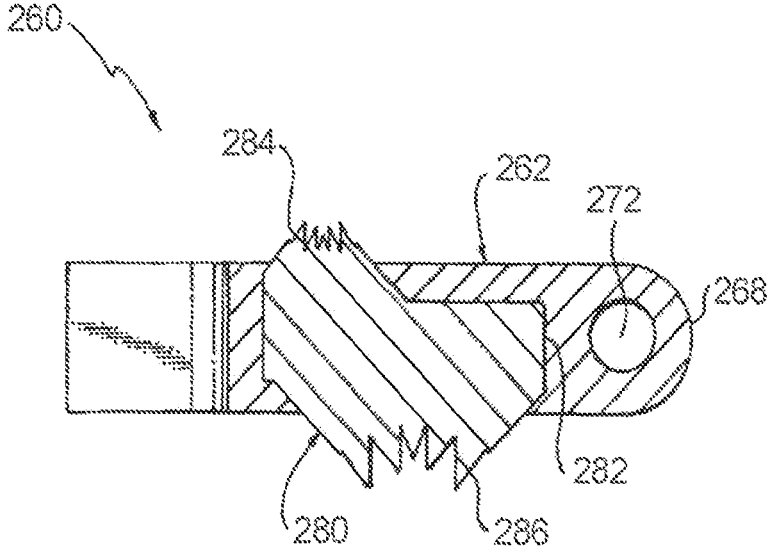
FIG. 20 is a front elevation view in partial cross-section of the insulation piercing assembly of FIG. 19 taken along line 20-20.

Referring to FIG. 20, embedded within the body 262 is an insulation piercing member 280. The insulation piercing member 280 includes a conductive body 282 having one or more tap conductor teeth 284 extending from one end of the conductive body 282, and one or more main conductor teeth 286 extending from another end of the conductive body 282. The conductive body 282, the one or more tap conductor teeth 284 and the one or more main conductor teeth 286 are made of an electrically conductive material, such as copper or aluminum, so that an electrically conductive path is created between the one or more tap conductor teeth 284 and the one or more main conductor teeth 286. In embodiments where the body 262 is made of an electrically conductive material, to electrically isolate the insulation piercing member 280 from the body 262 a non-conductive coating 288 is applied to the conductive body 282 so that only the one or more tap conductor teeth 284 and the one or more main conductor teeth 286 are exposed. Examples of suitable non-conductive coatings include injection molded thermoplastic coatings, epoxy coatings, rubber coatings and vinyl plastisol coatings.

In the configuration of FIGS. 12-20, the tap body 210 and cap 220 can be made of a rigid material that is electrically conductive, or a rigid material that is non-conductive an electrical insulating material). Examples of suitable electrically conductive materials include aluminum, cast aluminum, galvanized steel, and stainless steel. Examples of suitable non-conductive materials include rigid plastic materials and composite materials, e.g., carbon fiber.

Figure 21:
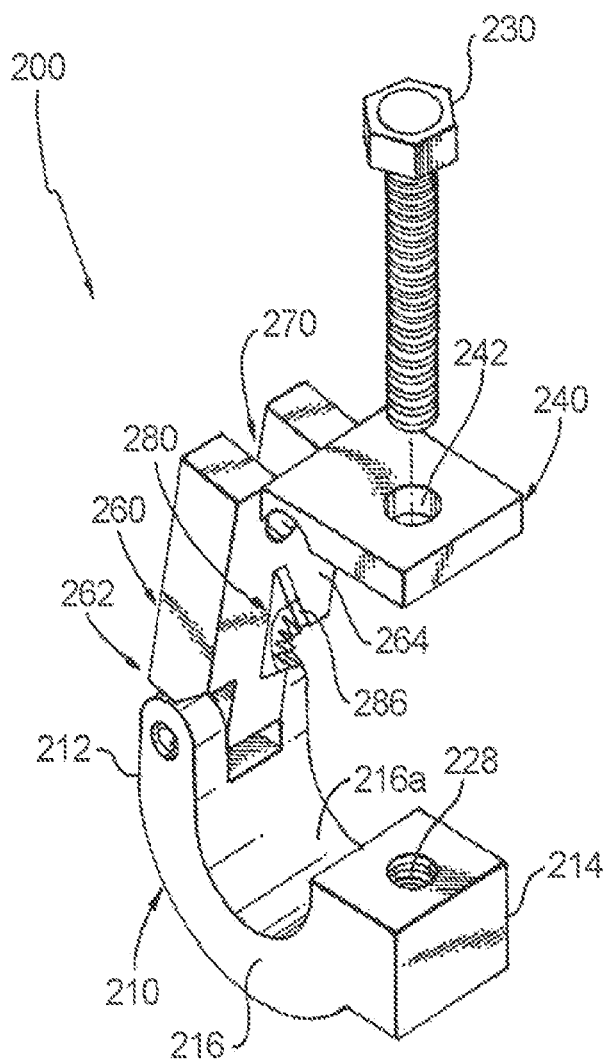
FIG. 21 is a top perspective view of the tap connector of FIG. 12 with a cap removed from the tap connector and the insulation piercing assembly in an open position.
Figure 22:
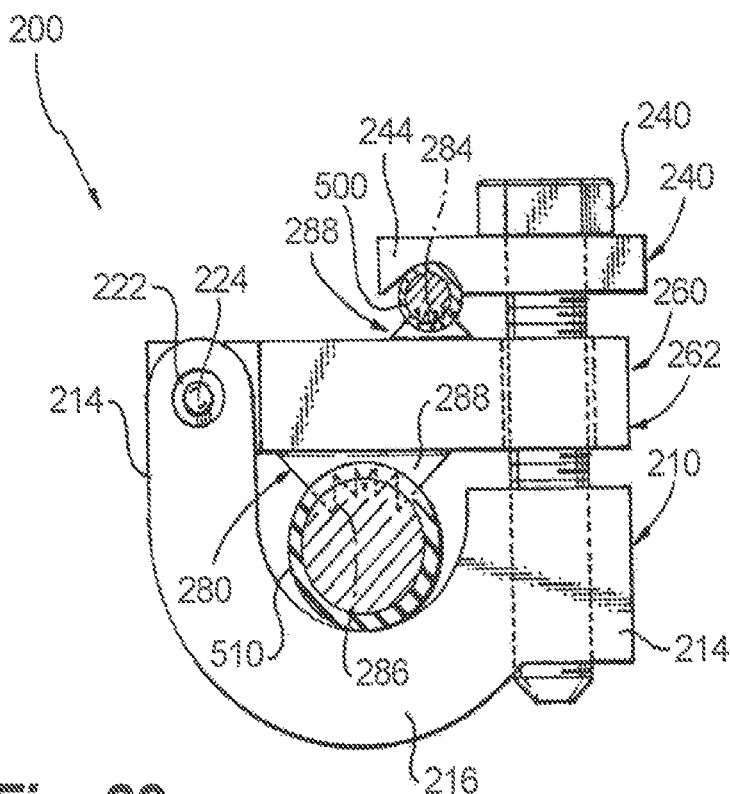
FIG. 22 is a front elevation view of the tap of FIG. 20 illustrating in partial cross-section tap conductor teeth piercing a tap conductor and main conductor teeth piercing a main conductor.
Figure 23:
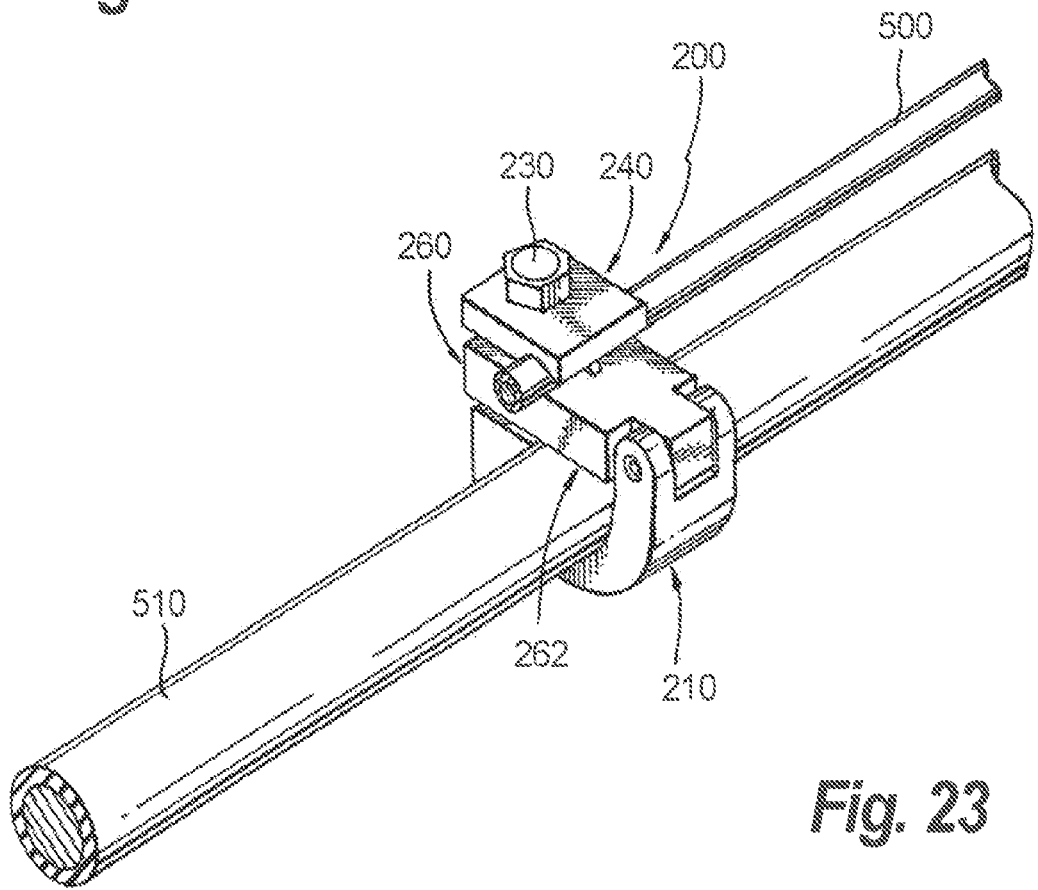
FIG. 23 is a perspective view of the tap connector of FIG. 22.
Figure 24:
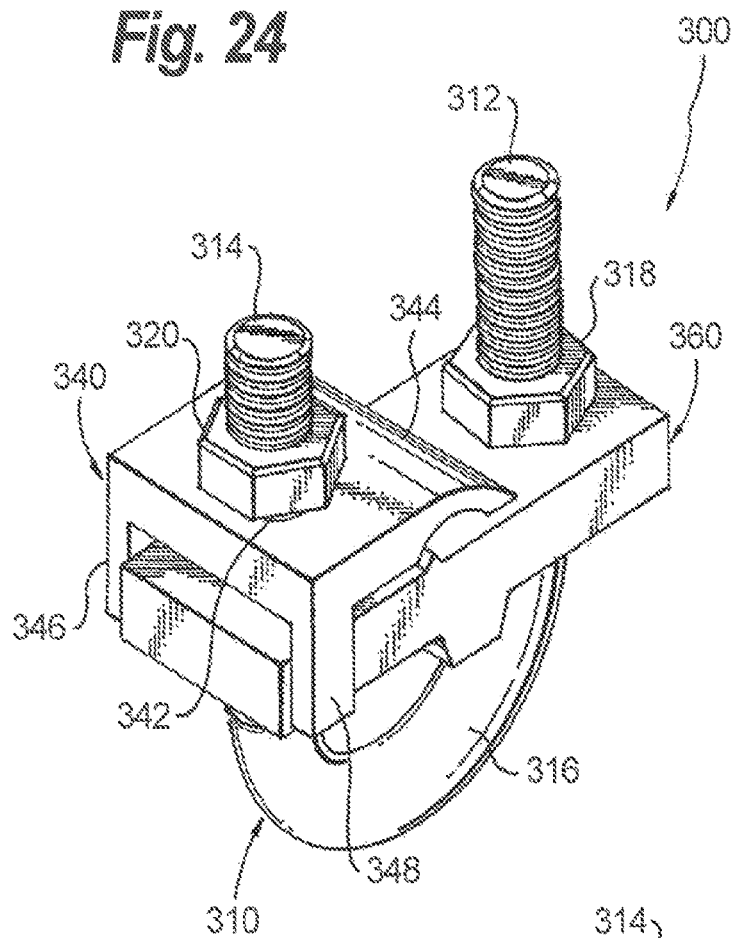
FIG. 24 is a perspective view of another exemplary embodiment of a tap connector according to the present disclosure.
Figure 25:
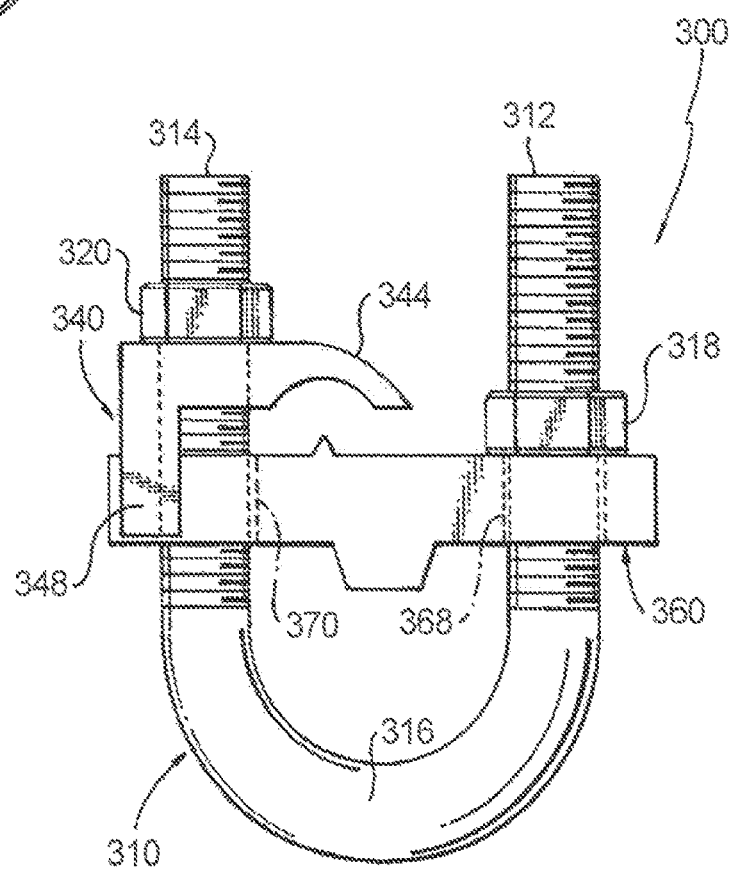
FIG. 25 is a front elevation view of the tap of FIG. 24 illustrating a tap body and an insulation piercing assembly attached to the tap body.
Figure 26:
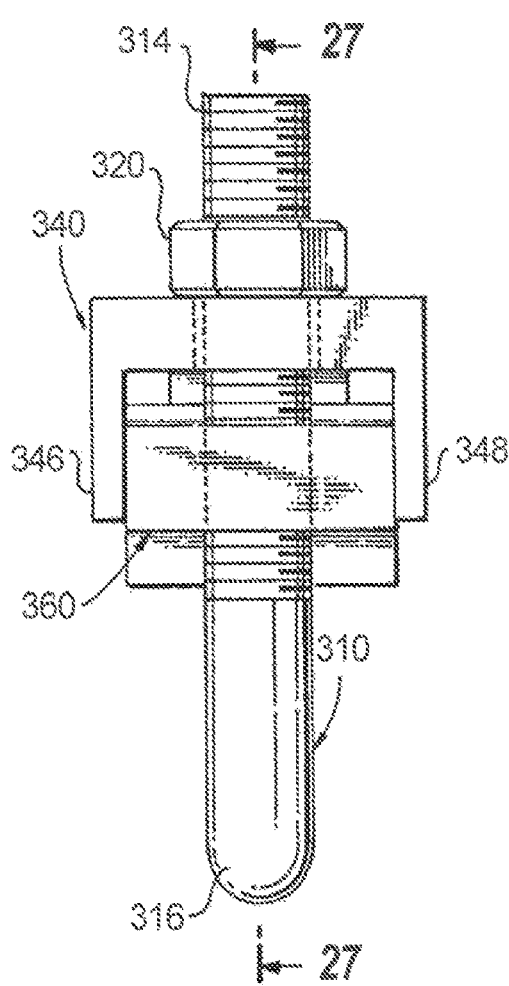
FIG. 26 is a side elevation view of the tap connector of FIG. 24.
Figure 27:
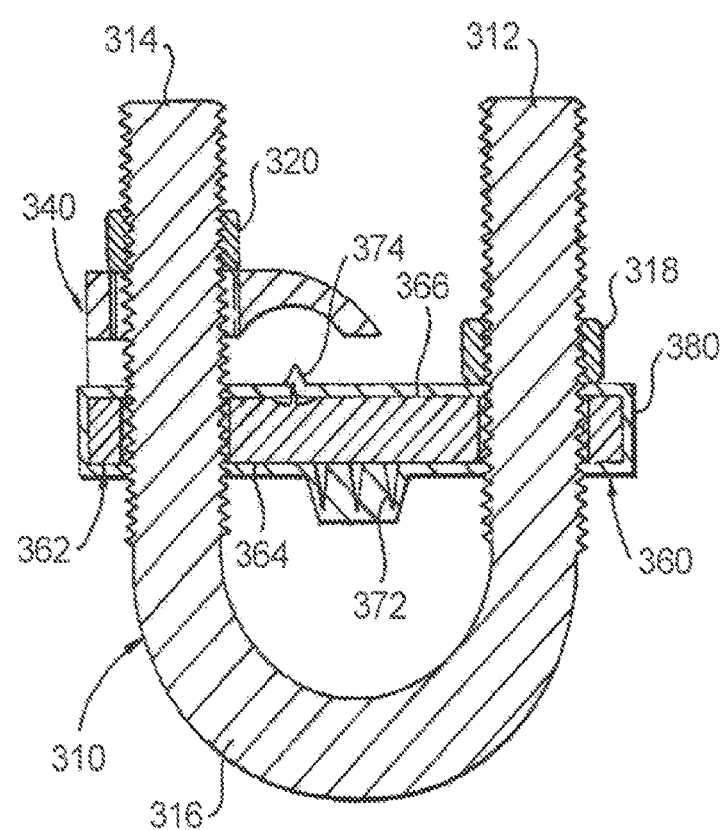
FIG. 27 is a cross-sectional view of the tap connector of FIG. 26 taken along line 27-27.

Referring now to FIGS. 21-23, to install the tap connector 200 a technician removes the bolt 230 from the tap body 210 and separates the cap 240 from the tap connector 200. The technician then pivots the insulation piercing assembly 260 to the open position, as seen in FIG. 21. A main conductor 510 is then positioned in the conductor receiving portion 216 of the tap body 210 which aligns the main conductor 510 for engagement by the main conductor teeth 286 of the assembly 260. The technician pivots the assembly 260 so that the main side 264 of the body 262 is adjacent the main conductor 510. The technician loosely attaches the cap 240 to the tap body 210 with bolt 230. A tap conductor 500 is then positioned in the conductor receiving portion 244 of the cap 240 so that the tap conductor 500 is aligned with the tap conductor teeth 284 extending from the body 262 of the assembly 260. The bolt 230 is then tightened so that the tap conductor teeth 284 pierce through the insulation surrounding the tap conductor 500 and contact the tap conductor, as shown in FIG. 22. At the same time, the main conductor teeth 286 extending from the body 262 of the assembly 260 pierce through the insulation surrounding the main conductor 510 and contact the main conductor 510 as shown. At this point, the tap conductor 500 is electrically connected to the main conductor 510.

Turning to FIGS. 24-29, another exemplary embodiment of the tap connector according to the present disclosure is shown. In this embodiment, the tap connector 300 includes a tap body 310, a cap 340 and an insulation piercing assembly 360. The tap body 310 has a first leg 312, a second leg 314 and a conductor receiving portion 316 between the first and second legs, which may form a U-Shaped type member. In this exemplary embodiment, the U-shaped member is a U-bolt where the first leg 312 and the second leg 314 are threaded rods. The conductor receiving portion 316 is shaped to receive, support and align a conductor, such as main conductor 510 described above, relative to the insulation piercing assembly 360. The cap 340 and insulation piercing assembly 360 are secured to the tap body 310 using nuts 318 and 320.

The cap 340 has an aperture 342 through which one leg of the tap body 310, e.g., the second leg 314, can pass. The cap 340 also includes and a conductor receiving portion 344 that is shaped to receive, support and align a conductor, such as tap conductor 500 described above, relative to the insulation piercing assembly 360. In the embodiment shown, the conductor receiving portion 344 is a groove that is generally arcuate in shape to receive a circular or round conductor and align the conductor with the insulation piercing assembly 360 as described below. However, the groove may have other shapes sufficient to receive, support and align an electrical conductor relative to the assembly 360. Extending from the cap 340 are legs 346 and 348 that fit around the assembly 360 to limit rotational movement of the cap 340 relative to the assembly when the nut 320 is tightened.

For ease of description, the insulation piercing assembly 360 may also be referred to as the "assembly." The assembly 360 includes a tooth support body 362 having a main side 364 and a tap side 366. The tooth support body 362 may also be referred to as the "body." Extending through the body 362 are two apertures 368 and 370, seen in dotted lines in FIG. 25, through which the first and second legs 312 and 314 can pass through. The body 362 may be solid or hollow, and is made of a rigid material that is electrically conductive, such as a copper or aluminum. Extending from the main side 364 of the body 362 are one or more main conductor teeth 372, and extending from the tap side 366 of the body 362 are one or more tap conductor teeth 374. To electrically isolate the body 362 from the tap body 310 and the cap 340, the body 362 has a non-conductive coating 380, seen in FIG. 27, applied to the exterior surface of the body 362. The non-conductive coating 380 may also coat the exterior surface of the apertures 368 and 370. Examples of suitable non-conductive coatings include injection molded thermoplastic coatings, epoxy coatings, rubber coatings and vinyl plastisol coatings. When the nuts 318 and 320 are tightened to the legs 312 and 314 respectively, as described below, the one or more main conductor teeth 372 and the one or more tap conductor teeth 374 pierce through the non-conductive coating 380.

Figure 28:
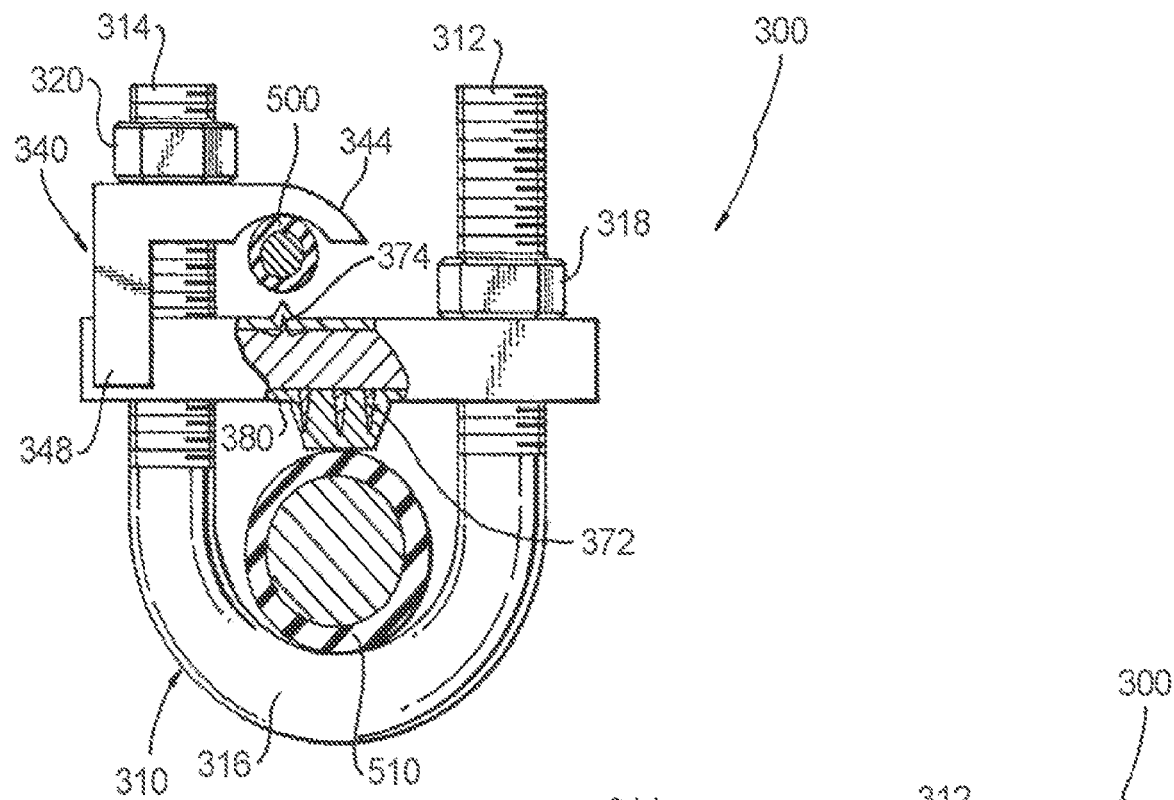
FIG. 28 is a side elevation view in partial cross-section of the tap connector of FIG. 24 illustrating a tap conductor in a conductor receiving portion of the cap of the tap connector, and a main conductor in a conductor receiving portion of the tap body.
Figure 29:
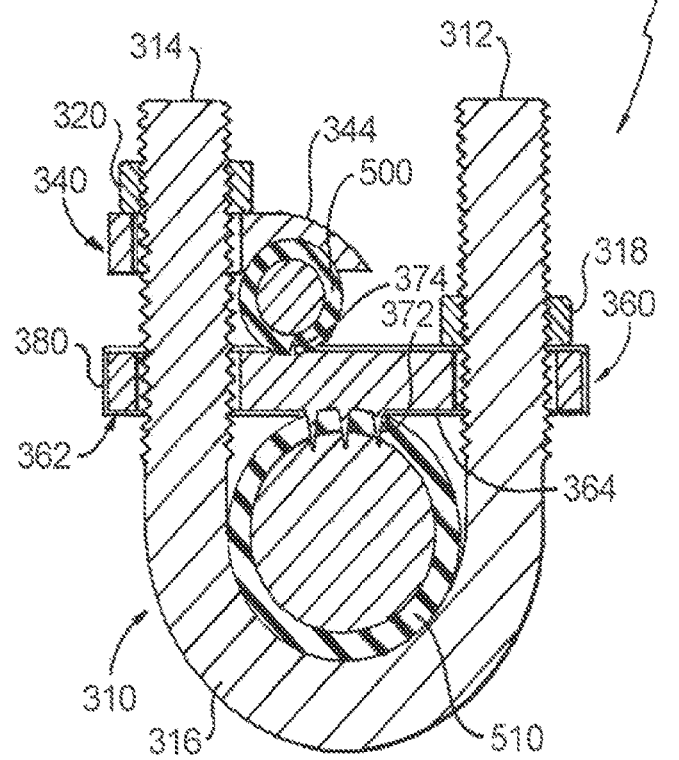
FIG. 29 is a side elevation view in cross-section of the tap connector of FIG. 28 illustrating tap conductor teeth piercing a tap conductor, and main conductor teeth piercing a main conductor.

Referring to FIGS. 28 and 29, to install the tap connector 300 a technician removes the nuts 318 and 320 from the tap body 310 and separates the cap 340 and the assembly 360 from the tap body 310. A main conductor, e.g., main conductor 510, is then positioned in the conductor receiving portion 316 of the tap body 310 which aligns the main conductor 510 for engagement by the main conductor teeth 372 of the assembly 360. The first and second legs 312 and 314 are then inserted through the apertures 368 and 370 respectively, of the assembly 360, seen in FIG. 25, so that the main side 364 of the body 362 is adjacent the main conductor 510 and the main conductor is aligned for engagement with the main conductor teeth 372. The technician loosely attaches the nut 318 to the first leg 312 of the tap body 310, and loosely attaches the cap 340 to the tap body 310 with nut 320. A tap conductor 500 is then positioned in the conductor receiving portion 344 of the cap 340 so that the tap conductor 500 is aligned with the one or more tap conductor teeth 374. The nuts 318 and 320 are then tightened so that the one or more tap conductor teeth 374 pierce through the non-conductive coating 380 on the body 362 and through the insulation surrounding the tap conductor 500 so that the one or more tap conductor teeth 374 contact the tap conductor 500. At the same time, the main conductor teeth 372 pierce through the non-conductive coating 380 on the body 362 and through the insulation surrounding the main conductor 510 so that the one or more main conductor teeth 372 contact the main conductor 510. At this point, the tap conductor 500 is electrically connected to the main conductor 510.

It should be noted, that by electrically isolating the conductive path between a main conductor teeth 372 and the tap conductor teeth 374 from the other components of the tap connector 300, for example, the tap body 310, the cap 340 and the fasteners used to secure the cap 340 and the insulation piercing assembly 360 to the tap body 310, a technician or object may contact the tap connector 300 after installation without being subject to the electrical current flowing between the main conductor 500 and the tap conductor 510. Further, while exemplary embodiments have been chosen to illustrate the invention, it will be understood by those skilled in the art that various changes, modifications, additions, and substitutions are possible, without departing from the scope and spirit of the invention.

What is claimed is:

1. A tap connector for electrically connecting a tap conductor to a main conductor, the tap connector comprising:
    a tap body having a first side wall, a second side wall, a base at one end of the tap body between the first and second side walls and a cap at another end of the tap body between the first and second side walls;
    a keeper positioned between the first and second side walls and movable toward and away from the cap relative to the tap body, the keeper having a tap conductor groove and a coupling member;
    a stem having a stem coupling member at one end of a threaded shaft and a tool mounting member at the other end of the threaded shaft, the threaded shaft being positioned within a threaded aperture in the base of the tap body so that the stem coupling member is coupled to the keeper coupling member such that rotational movement of the stem is translated to linear movement of the keeper; and
    an insulation piercing assembly movably secured to the side walls of the tap body and positioned adjacent the keeper so that movement of the keeper toward the cap can move the insulation piercing assembly toward the cap, the insulation piercing assembly being capable of piercing insulation surrounding the main conductor and the tap conductor to create an electrically conductive path between the main conductor and the tap conductor.

2. The tap connector according to claim 1, wherein the insulation piercing member is conductive such that the main conductor teeth and the tap conductor teeth are electrically connected to each other.

3. The tap connector according to claim 1, wherein the insulation piercing assembly comprises:
    a non-conductive body;
    a side wall mounting member positioned at each end of the body for movably securing the insulation piercing assembly to the side walls of the tap body; and
    an insulation piercing member embedded in the non-conductive body, the insulation piercing member having one or more main conductor teeth extending from one end and one or more tap conductor teeth extending from another end;
    wherein the one or more main conductor teeth are insulated until the one or more main conductor teeth penetrate insulation surrounding a main conductor, and the one or more tap conductor teeth are insulated until the one or more tap conductor teeth penetrate insulation surrounding a tap conductor.

4. The tap connector according to claim 3, further comprising:
    a flexible non-conductive main side cap releasably secured to the non-conductive body and positioned over the one or more main conductor teeth to insulate the one or more main conductor teeth until the one or more main conductor teeth penetrate the insulation surrounding the main conductor; and
    a flexible non-conductive tap side cap releasably secured to the non-conductive body and positioned over the one or more tap conductor teeth to insulate the one or more tap conductor teeth until the one or more tap conductor teeth penetrate the insulation surrounding the tap conductor.

5. A tap connector for electrically connecting a tap conductor to a main conductor, the tap connector comprising:
    a tap body having a base, a pair of side walls and a removable cap connected to a distal end of each of the pair of side walls, wherein the tap body is capable of securing the main conductor and the tap conductor to the tap connector; and
    an insulation piercing assembly positioned between the base, the pair of side walls and the removable cap of the tap body, the insulation piercing assembly being movable at least relative to the tap body, the insulation piercing assembly comprising:
        a non-conductive body having a main side, a tap side and a center pocket;
        an insulation piercing member having a conductive body positioned within the center pocket of the non-conductive body, one or more main conductor teeth extending from one end of the conductive body such that the one or more main conductor teeth extend from the main side of the non-conductive body, and one or more tap conductor teeth extending from another end of the conductive body such that the one or more tap conductor teeth extend from the tap side of the non-conductive body;

a first cap made of a flexible nonconductive material attached to the main side of the non-conductive body and covering the one or more main conductor teeth, wherein the first cap is selectively pierceable by the one or more main conductor teeth to from an electrical connection between the conductive body and the main conductor; and a second cap made of a flexible non-conductive material attached to the tap side of the non-conductive body and covering the one or more tap conductor teeth, wherein the second cap is selectively pierceable by the one or more tap conductor teeth to form an electrical connection between the conductive body and the tap conductor.

6. The tap connector according to claim 5, wherein when the main conductor teeth pierce the insulation surrounding the main conductor the one or more main conductor teeth pierce through the first cap such that the first cap acts as a gasket to provide a watertight seal around the one or more main conductor teeth.

7. The tap connector according to claim 5, wherein when the tap conductor teeth pierce the insulation surrounding the tap conductor the one or more tap conductor teeth pierce through the second cap such that the second cap acts as a gasket to provide a watertight seal around the one or more tap conductor teeth.

8. The tap connector according to claim 5, wherein the first cap is permanently secured to the non-conductive body, and the second cap is permanently secured to the non-conductive body.

9. The tap connector according to claim 5, wherein the insulation piercing assembly is movable at least relative to the tap body by sliding the insulation piercing assembly along the tap body.

10. A tap connector for electrically connecting a tap conductor to a main conductor, the tap connector comprising:

a tap body having a first side wall, a second side wall, a base at one end of the tap body between the first and second side walls and a cap releasably secured to another end of the tap body between the first and second side walls;

a keeper positioned between the first and second side walls and movable toward and away from the cap relative to the tap body, the keeper having a tap conductor groove and a coupling member;

a stem extending at least partially through the base with having one end coupled to the keeper and another end capable of being attached to a tool, the stem being movable relative to the base such that movement of the stem translates to movement of the keeper; and an insulation piercing assembly movably coupled to the side walls of the tap body and positioned adjacent the keeper so that movement of the keeper toward the cap can move the insulation piercing assembly toward the cap, the insulation piercing assembly being capable of piercing insulation surrounding the main conductor and the tap conductor to create an electrically conductive path between the main conductor and the tap conductor.

11. The tap connector according to claim 10, wherein the insulation piercing member is conductive such that the main conductor teeth and the tap conductor teeth are electrically connected to each other.

12. The tap connector according to claim 10, wherein the insulation piercing assembly comprises:

a non-conductive body;

a side wall mounting member positioned at each end of the body for movably coupling the insulation piercing assembly to the side walls of the tap body; and an insulation piercing member positioned within the non-conductive body, the insulation piercing member having one or more main conductor teeth extending from one end and one or more tap conductor teeth extending from another end;

wherein the one or more main conductor teeth are insulated until the one or more main conductor teeth penetrate insulation surrounding a main conductor, and the one or more tap conductor teeth are insulated until the one or more tap conductor teeth penetrate insulation surrounding a tap conductor.

13. The tap connector according to claim 12, further comprising:

a flexible non-conductive main side cap releasably secured to the non-conductive body and positioned over the one or more main conductor teeth to insulate the one or more main conductor teeth until the one or more main conductor teeth penetrate the insulation surrounding the main conductor; and a flexible non-conductive tap side cap releasably secured to the non-conductive body and positioned over the one or more tap conductor teeth to insulate the one or more tap conductor teeth until the one or more tap conductor teeth penetrate the insulation surrounding the tap conductor.

14. A tap connector for electrically connecting a tap conductor to a main conductor, the tap connector comprising:

a tap body having a base, a pair of side walls, and a cap extending between and connected to a distal end of each of the pair of side walls;

an insulation piercing assembly movably coupled to the pair of side walls of the tap body, the insulation piercing assembly comprising:

a non-conductive body having a main side, a tap side and a center pocket;

an insulation piercing member having a conductive body positioned within the center pocket of the non-conductive body, one or more main conductor teeth extending from one end of the conductive body such that the one or more main conductor teeth extend from the main side of the non-conductive body, and one or more tap conductor teeth extending from another end of the conductive body such that the one or more tap conductor teeth extend from the tap side of the non-conductive body;

a first cap made of a non-conductive material attached to the main side of the non-conductive body and covering the one or more main conductor teeth; and a second cap made of a non-conductive material attached to the tap side of the non-conductive body and covering the one or more tap conductor teeth; and a stem positioned within an aperture in the base of the tap body such that movement of the stem is translated to movement of the insulation piercing assembly.

15. The tap connector according to claim 14, wherein when the main conductor teeth pierce the insulation surrounding the main conductor the one or more main conductor teeth pierce through the first cap such that the first cap acts as a gasket to provide a watertight seal around the one or more main conductor teeth.

16. The tap connector according to claim 14, wherein when the tap conductor teeth pierce the insulation surrounding the tap conductor the one or more tap conductor teeth pierce through the second cap such that the second cap acts as a gasket to provide a watertight seal around the one or more tap conductor teeth.

17. The tap connector according to claim 14, wherein the first cap is permanently secured to the non-conductive body, and the second cap is permanently secured to the non-conductive body.

18. The tap connector according to claim 17, wherein the first cap is permanently secured to the non-conductive body using adhesives, and the second cap is permanently secured to the non-conductive body using adhesives.

* * * * *